(12) United States Patent
Govindarajulu et al.

(10) Patent No.: US 12,189,372 B2
(45) Date of Patent: Jan. 7, 2025

(54) SYSTEM, DEVICE AND METHOD FOR MANAGING AND OPTIMIZING CONNECTION BETWEEN FIELD DEVICES AND AUTOMATION DEVICES

(71) Applicants: Sudhakar Govindarajulu, Tamilnadu (IN); Nikhil Vishwas Kulkarni, Karnataka (IN); Vijeth Krishna P N, Kerala (IN); Gurumurthy Surapasetty, Karnataka (IN)

(72) Inventors: Sudhakar Govindarajulu, Tamilnadu (IN); Nikhil Vishwas Kulkarni, Karnataka (IN); Vijeth Krishna P N, Kerala (IN); Gurumurthy Surapasetty, Karnataka (IN)

(73) Assignee: Siemens Aktiengesellschaft, Munich (DE)

( * ) Notice: Subject to any disclaimer, the term of this patent is extended or adjusted under 35 U.S.C. 154(b) by 571 days.

(21) Appl. No.: 17/478,038

(22) Filed: Sep. 17, 2021

(65) Prior Publication Data
US 2022/0004169 A1    Jan. 6, 2022

Related U.S. Application Data

(63) Continuation of application No. PCT/EP2020/000074, filed on Mar. 19, 2020.

(30) Foreign Application Priority Data

Mar. 19, 2019  (EP) ..................................... 19163791

(51) Int. Cl.
*G05B 19/41*  (2006.01)
*G05B 19/418*  (2006.01)

(52) U.S. Cl.
CPC ... *G05B 19/41845* (2013.01); *G05B 19/4185* (2013.01); *G05B 19/41885* (2013.01);
(Continued)

(58) Field of Classification Search
CPC .......... G05B 19/41845; G05B 19/4185; G05B 19/41885; G05B 2219/23431;
(Continued)

(56) References Cited

U.S. PATENT DOCUMENTS 6,889,282 B2 * 5/2005 Schollenberger .... H05K 7/1472
                                                                710/305
9,709,978 B2    7/2017 Asenjo
(Continued)

FOREIGN PATENT DOCUMENTS

CN    104137370 A    11/2014
CN    104142630 A    11/2014
(Continued)

*Primary Examiner* — Christopher W Carter
(74) *Attorney, Agent, or Firm* — Lempia Summerfield Katz LLC (57) ABSTRACT

A system, device, and method for managing connections in an industrial installation are described. The system includes one or more field devices, one or more automation devices, and a self-configurable device. The self-configurable device is adapted to dynamically configure, based on type of the one or more field devices and the one or more automation devices, such that the self-configurable device manages a connection between the one or more field devices and the one or more automation devices. The self-configurable device is adapted to calibrate one or more field devices and manage automation functions in the industrial installation.

12 Claims, 8 Drawing Sheets

(52) U.S. Cl.
CPC ............. *G05B 2219/23431* (2013.01); *G05B 2219/23456* (2013.01); *G05B 2219/25011* (2013.01); *G05B 2219/25066* (2013.01); *G05B 2219/25428* (2013.01)

(58) Field of Classification Search
CPC ........... G05B 2219/23456; G05B 2219/25011; G05B 2219/25066; G05B 2219/25428; G05B 19/054; G05B 19/0423; G05B 2219/25139; G05B 2219/31106; G05B 2219/31121; G05B 2219/31129; G05B 2219/31131; G05B 2219/31348; G05B 2219/33125; Y02P 90/02
See application file for complete search history.

(56) References Cited

U.S. PATENT DOCUMENTS

| | | | |
|---|---|---|---|
| 10,048,348 B2 | 8/2018 | Hussey | |
| 10,496,061 B2 | 12/2019 | Strohmenger | |
| 10,564,633 B2 | 2/2020 | Asenjo | |
| 10,756,652 B2 | 8/2020 | Perra | |
| 11,409,251 B2 | 8/2022 | Strohmenger | |
| 11,927,929 B2 | 3/2024 | Strohmenger | |
| 2004/0153594 A1* | 8/2004 | Rotvold | G05B 19/4186 710/305 |
| 2013/0241456 A1 | 9/2013 | Leonard | |
| 2013/0242439 A1 | 9/2013 | Leonard | |
| 2014/0336786 A1 | 11/2014 | Asenjo et al. | |
| 2015/0127816 A1 | 5/2015 | Kruglick | |
| 2015/0127876 A1 | 5/2015 | Erni et al. | |
| 2015/0355901 A1* | 12/2015 | Bonissone | G06F 8/70 717/120 |
| 2016/0274553 A1 | 9/2016 | Strohmenger | |
| 2017/0038453 A1 | 2/2017 | Hussey | |
| 2017/0277171 A1 | 9/2017 | Asenjo | |
| 2018/0211176 A1* | 7/2018 | Khurshudov | H04L 67/12 |
| 2020/0041969 A1 | 2/2020 | Strohmenger | |
| 2020/0248923 A1* | 8/2020 | Snider | F24F 11/77 |
| 2023/0013700 A1 | 1/2023 | Strohmenger | |

FOREIGN PATENT DOCUMENTS

| | | |
|---|---|---|
| CN | 107850642 A | 3/2018 |
| DE | 102014103422 A1 | 9/2014 |
| EP | 2801941 A1 | 11/2014 |
| EP | 3070550 A1 | 9/2016 |
| WO | 2009006621 A2 | 1/2009 |

\* cited by examiner

FIG 7

SYSTEM, DEVICE AND METHOD FOR MANAGING AND OPTIMIZING CONNECTION BETWEEN FIELD DEVICES AND AUTOMATION DEVICES

This application is a continuation application of International Application No. PCT/EP2020/000074, filed Mar. 19, 2020, which claims the benefit of European Patent Application No. EP 19163791.7, filed Mar. 19, 2019. The entire contents of these documents are hereby incorporated herein by reference.

BACKGROUND

The present disclosure relates to a system, device, and method for managing connection between field devices and automation devices in an industrial installation.

An industrial installation such as a power plant or a refinery includes a plurality of field devices or components. Conventional junction boxes are used to manage termination signals from such field devices and components in the industrial installations. Such information from the field devices may be time-stamped and classified based on one or more requirements such as monitoring, controlling, archiving, communicating and calculating various parameters in the industrial installation, maintenance of the industrial installation, communication between one or more devices and components in the industrial installation, and to provide remote access to such devices and components. Currently, such classification may not be performed, and information from the field devices and components may be routed to specific target systems. Further, a field device may connect to only a specific input-output (IO) module. Similarly, other devices that may communicate using different communication protocols may require different IO modules that support such communication protocols.

In the current art of industrial automation, information from the field devices and automation devices are collected and processed at distributed IO modules and are configured by the industrial controller. Therefore, the controller manages all the inputs from various devices deployed in the industrial installation for efficient management of the industrial installation. The inputs may also include parameters associated with monitoring, archiving, and remote access/control of the industrial installation. Such inputs may not be needed for actual process control of the industrial installation. However, such inputs are configured by the controller, thereby affecting the performance of the controller and plant productivity.

Alternative solutions may include use of a passive junction box placed in the vicinity of the field devices and other components. However, management of such passive junction box requires higher efforts and skill and may be error-prone.

SUMMARY AND DESCRIPTION

The scope of the present invention is defined solely by the appended claims and is not affected to any degree by the statements within this summary.

In light of the above, there exists a need for an improved and intelligent system in an industrial installation that is capable of managing connections between one or more field devices and other components in the industrial installation. There also exists a need to provide a device that supports field devices and automation devices irrespective of the communication protocols supported by such field devices and automation devices.

The present embodiments may obviate one or more of the drawbacks or limitations in the related art. For example, a system, a device, and a method for managing connections between one or more field devices and one or more automation devices in an industrial installation that are agnostic to communication protocols of such devices, are efficient, and identify fault conditions in the industrial installation are provided.

In the following, the solution according to the present disclosure is described with respect to the claimed system, claimed device, as well as with respect to the claimed method. Features, advantages or alternative embodiments herein may be assigned to the other claimed objects and vice versa. In other words, claims for the system and device may be improved with features described or claimed in the context of the method. In this case, the functional features of the method are embodied by objective units of the system.

The present disclosure achieves the object by an automation system that includes one or more field devices and one or more automation devices. One or more field devices may be deployed in the industrial installation and are configured to capture one or more parameters associated with the functioning of the industrial installation. The field devices may include, for example, actuators, sensors, pneumatic devices, transmitters, switches, etc. The industrial installation may also include one or more automation devices such as programmable logic controllers, human machine interface (HMI) devices, archiving devices, communication systems, etc. The automation system further includes a self-configurable device adapted to dynamically configure based on the type of one or more field devices and one or more automation devices. In an embodiment, the self-configurable device may be capable of dynamically performing a self-configuration based on the type of field devices and/or automation devices connected to such self-configurable device. Such configuration of the self-configurable device enables the self-configurable device to manage a connection between the one or more field devices and the one or more automation devices. In an embodiment, the self-configurable device may be a multi-functional field termination unit. In one embodiment, the self-configurable device enables achieving a connection between one or more field devices and one or more automation devices without the need for multiple input/output (IO) modules. Therefore, dependency on different compatible IO modules for devices employing different communication protocols is eliminated.

According to an embodiment, the self-configurable device includes at least one first port. The at least one first port may be configured to connect to one or more field devices. The self-configurable device further includes at least one second port that may be configured to connect to one or more automation devices. The at least one first port and the at least one second port may be, for example, IO modules that are configured to enable data exchange between one or more components. The self-configurable device further includes a processing unit and a memory. In one embodiment, the self-configurable device is configured to efficiently manage a connection between the one or more field devices and the one or more automation devices.

According to another embodiment, the memory of the self-configurable device includes a self-configuration module. The self-configuration module may be configured to identify one or more field devices installed in the industrial installation. The self-configuration module is further configured to identify one or more automation devices installed in the industrial installation. Such identification of one or more field devices and automation devices may be performed based on one or more signals from the one or more field devices and the one or more automation systems. The self-configuration module is further configured to establish a connection between the one or more field devices and the one or more automation devices. In an embodiment, the industrial installation may include more than one self-configurable devices. A communication channel may be established between such one or more self-configurable devices, thereby enabling inter-device communication.

According to yet another embodiment of the present disclosure, in establishing the connection between the one or more field devices and the one or more automation devices, the self-configuration module is configured to determine a network configuration associated with the industrial installation. The network configuration enables identification of one or more sources of signals in the industrial installation. Such signal sources may be, for example, field devices. The network configuration also enables identification of one or more target devices in the industrial installation. The target devices may be one or more devices intended to receive the signals from the field devices. Such one or more target devices may be the automation devices in the industrial installation (e.g., PLCs, human machine interfaces (HMIs), one or more controllers, one or more archiving servers, etc.). Determination of the network configuration in the industrial automation also enables identification of operating conditions of the one or more field devices and the one or more automation devices. The self-configuration module is further configured to identify at least one attribute associable with the one or more field devices. The at least one attribute may be, for example, data associated with type of field device, description of the field device, field device technology (FDT) configuration. Identification of at least one attribute associable with the one or more field devices enables derivation of type of signal(s) originating from the one or more field devices. The self-configuration module is further configured to identify at least one attribute associable with the one or more automation devices. Identification of at least one attribute associable with the one or more automation devices enables identification of a destination/target device of the signals originating from the one or more field devices. Such at least one attribute may be, for example, a function associated with the automation device such as monitoring and/or controlling a section of the industrial installation. The self-configuration module is further configured to determine an association between the one or more field devices and the one or more automation devices based on the at least one attribute associable with the one or more field devices and the at least one attribute associable with the one or more automation devices. Such association may be determined, for example, by performing a mapping between the signal source and the destination/target device intended for the signal. In one embodiment, an efficient connection between the one or more field devices and the one or more automation devices may be achieved.

According to an embodiment of the present disclosure, the self-configuration module is configured to receive a set of configuration settings based on the identified one or more field devices and the one or more automation devices. Such configuration settings may be received, for example, from a server. Such server may also be a cloud-based server. The configuration settings may include one or more parameters for configuring the self-configurable device. The self-configuration module is further configured to configure the self-configurable device using the configuration settings. Configuring the self-configurable device enables the self-configurable device to establish a communication channel between the one or more field devices and the one or more automation devices.

According to yet another embodiment of the present disclosure, the memory of the self-configurable device further includes a calibration module. The calibration module may be configured to automatically calibrate the automation system. In one embodiment, the self-configurable device calibrates the automation system and the one or more devices in the automation system, thereby providing efficient functioning and performance of the automation system.

According to an embodiment, the calibration module is configured to obtain a baseline state-space representation of the automation system. The baseline state-space representation includes a model of a set of at least one input variable, at least one output variable, and at least one state variable of the automation system corresponding to an optimum functioning of the automation system. State-space representation provides an overview of the state of the system at any given point in time. State variables are variables with values that evolve through time (e.g., state variables depend on the values of the state variables at any given time). State variables may depend on the input variables. Values of the output variables depend on the values of the state variables. In an embodiment, the baseline state-space representation may indicate a model of the automation system in an ideal state. Such baseline state-space representation may be automatically determined based on, for example, one or more optimum working conditions of at least a section of the industrial installation. The calibration module is further configured to determine a real-time state-space representation of the automation system. Such real-time state-space representation includes a model of a set of at least one input variable, at least one output variable, and at least one state variable corresponding to a real-time functioning of the automation system. The calibration module is further configured to compare the baseline state-space representation with the real-time state-space representation to identify a deviation. In an embodiment, if a deviation is identified, the calibration module may be configured to generate an alarm, for example, in an HMI device in the industrial installation. In a further embodiment, the user of the industrial installation may choose to calibrate the state-space representation of the automation system in real-time based on the baseline state-space representation. Such a selection may be performed by the user, for example, through a user interface of the HMI device. Alternatively, the user may also choose to calibrate the baseline state-space representation of the automation system based on the real-time state-space representation. In one embodiment, the calibration module enables efficient functioning of the automation system by calibrating the state space variables at regular intervals.

The present disclosure relates in one aspect to a method of managing a connection between one or more field devices and one or more automation devices in an industrial automation. The method includes identifying one or more field devices installed in the industrial installation. The method further includes identifying one or more automation devices installed in the industrial installation. Such identification of one or more field devices and automation devices may be performed based on one or more signals from the one or more field devices and the one or more automation systems.

The method further includes establishing a connection between the one or more field devices and the one or more automation devices.

According to yet another embodiment of the present disclosure, in establishing the connection between the one or more field devices and the one or more automation devices, the method includes determining a network configuration associated with the industrial installation. The network configuration enables identification of one or sources of signals in the industrial installation. Such signal sources may be, for example, field devices. The network configuration also enables identification of one or more target devices in the industrial installation. The target devices may be one or more devices intended to receive the signals from the field devices. Such one or more target devices may be the automation devices in the industrial installation (e.g., PLCs), one or more controllers, human machine interfaces (HMIs), archiving servers, etc. Determination of the network configuration in the industrial automation also enables identification of operating conditions of the one or more field devices and the one or more automation devices. The method further includes identifying at least one attribute associable with the one or more field devices. The at least one attribute may be, for example, data associated with type of field device, description of the field device, and/or field device technology (FDT) configuration. Identification of at least one attribute associable with the one or more field devices enables derivation of type of signal(s) originating from the one or more field devices. The method further includes identifying at least one attribute associable with the one or more automation devices. The at least one attribute may be, for example, data associated with type of automation device, description of the automation device, electronic device description (EDD). Identification of at least one attribute associable with the one or more automation devices enables identification of a destination/target device of the signals originating from the one or more field devices. The method further includes determining an association between the one or more field devices and the one or more automation devices based on the at least one attribute associable with the one or more field devices and the at least one attribute associable with the one or more automation devices. Such association may be determined, for example, by performing a mapping between the signal source and the destination/target device intended for the signal. In one embodiment, an efficient connection between the one or more field devices and the one or more automation devices may be achieved by optimizing network transmissions.

According to an embodiment of the present disclosure, the method includes receiving a set of configuration settings based on the identified one or more field devices and the one or more automation devices. Such configuration settings may be received, for example, from a server. Such server may also be a cloud-based server. The configuration settings may include one or more parameters for configuring the self-configurable device. The method further includes configuring the self-configurable device using the configuration settings. Configuring the self-configurable device enables the self-configurable device to establish a communication channel between the one or more field devices and the one or more automation devices.

According to yet another embodiment of the present disclosure, the method further includes automatically calibrating the automation system. In one embodiment, the method enables calibration of the automation system and the one or more devices in the automation system, thereby providing efficient functioning and performance of the automation system.

According to an embodiment, in calibrating the automation system, the method further includes obtaining a baseline state-space representation of the automation system. The baseline state-space representation includes a model of a set of at least one input variable, at least one output variable, and at least one state variable of the automation system corresponding to an optimum functioning of the automation system. State-space representation provides an overview of the state of the system at any given point in time. State variables are variables with values that evolve through time (e.g., state variables depend on the values of the state variables at any given time). State variables may depend on the input variables. Values of the output variables depend on the values of the state variables. In an embodiment, the baseline state-space representation may indicate a model of the automation system in an ideal state. In an embodiment, the baseline state-space representation may be automatically determined based on, for example, one or more optimum working conditions of at least a section of the industrial installation. The method further includes determining a real-time state-space representation of the automation system. Such real-time state-space representation includes a model of a set of at least one input variable, at least one output variable, and at least one state variable corresponding to a real-time functioning of the automation system. Such input variable, output variable, and state variable may be determined based on an engineering configuration of at least one section of the industrial installation and the run-time performance of the at least one section of the industrial installation. The method further includes comparing the baseline state-space representation with the real-time state-space representation to identify a deviation. In an embodiment, if a deviation is identified, the method may further include generating an alarm, for example, in an HMI device in the industrial installation. In a further embodiment, the user of the industrial installation may choose to calibrate the state-space representation of the automation system in real-time based on the baseline state-space representation. Such a selection may be performed by the user, for example, through a user interface of the HMI device. Alternatively, the user may also choose to calibrate the baseline state-space representation of the automation system based on the real-time state-space representation. In one embodiment, efficient functioning of the automation system is enabled by calibrating the state space variables at regular intervals.

The present disclosure also relates to a self-configurable device including a self-configuration module, where the self-configuration module is configured to perform the method acts.

The present disclosure relates in one aspect to a computer program product including a computer program. The computer program is loadable into a storage unit of a system. The computer program includes program code sections to make the system execute the method according to an aspect of the present disclosure when the computer program is executed in the system.

The present disclosure relates in one aspect to a computer-readable medium, on which program code sections of a computer program are saved. The program code sections are loadable into and/or executable in a system to make the system execute the method according to an aspect of the present disclosure when the program code sections are executed in the system.

The realization of the present disclosure by a computer program product and/or a computer-readable medium has the advantage that already existing management systems may be easily adopted by software updates in order to work as proposed by the present disclosure.

The computer program product may be, for example, a computer program or include another element apart from the computer program. This other element may be hardware (e.g., a non-transitory computer-readable storage medium such as a memory device), on which the computer program is stored, a hardware key for using the computer program and the like, and/or software (e.g., a documentation or a software key for using the computer program).

BRIEF DESCRIPTION OF THE DRAWINGS

The present disclosure is further described hereinafter with reference to illustrated embodiments shown in the accompanying drawings, in which.

DETAILED DESCRIPTION

Hereinafter, embodiments for carrying out the present disclosure are described in detail. The various embodiments are described with reference to the drawings, where like reference numerals are used to refer to like elements throughout. In the following description, for purpose of explanation, numerous specific details are set forth in order to provide a thorough understanding of one or more embodiments. It may be evident that such embodiments may be practiced without these specific details.

Figure 1A:
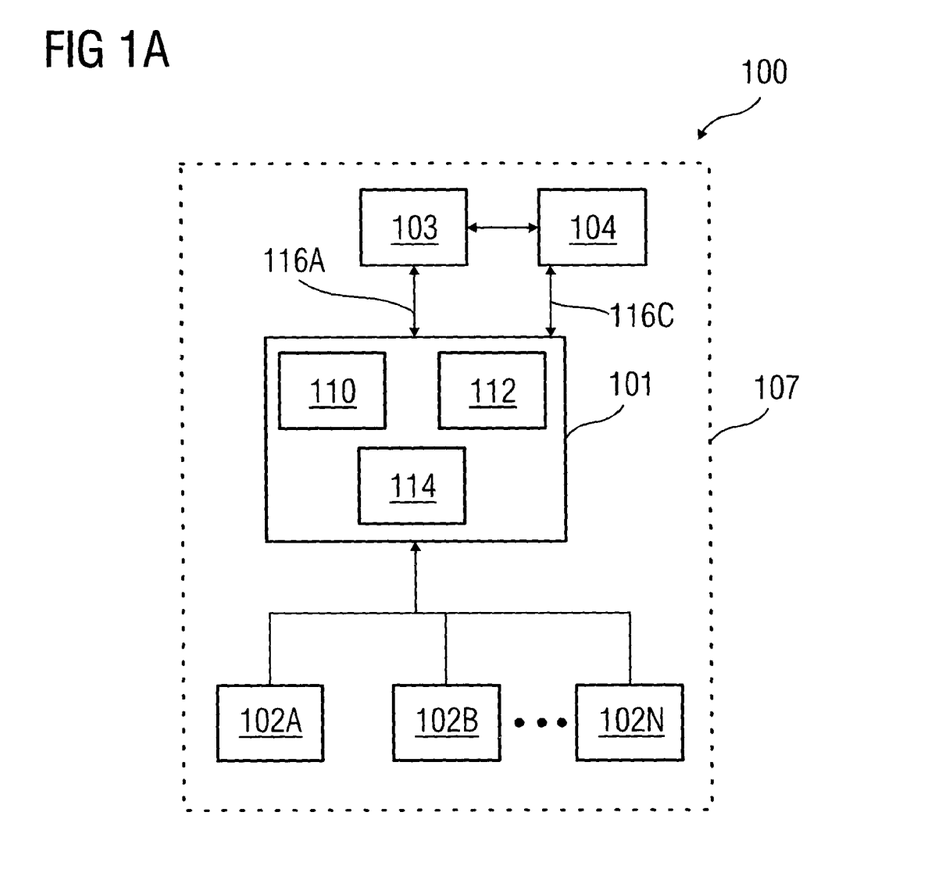
FIG. 1A is a schematic representation of an automation system, according to a first embodiment.
Figure 1B:
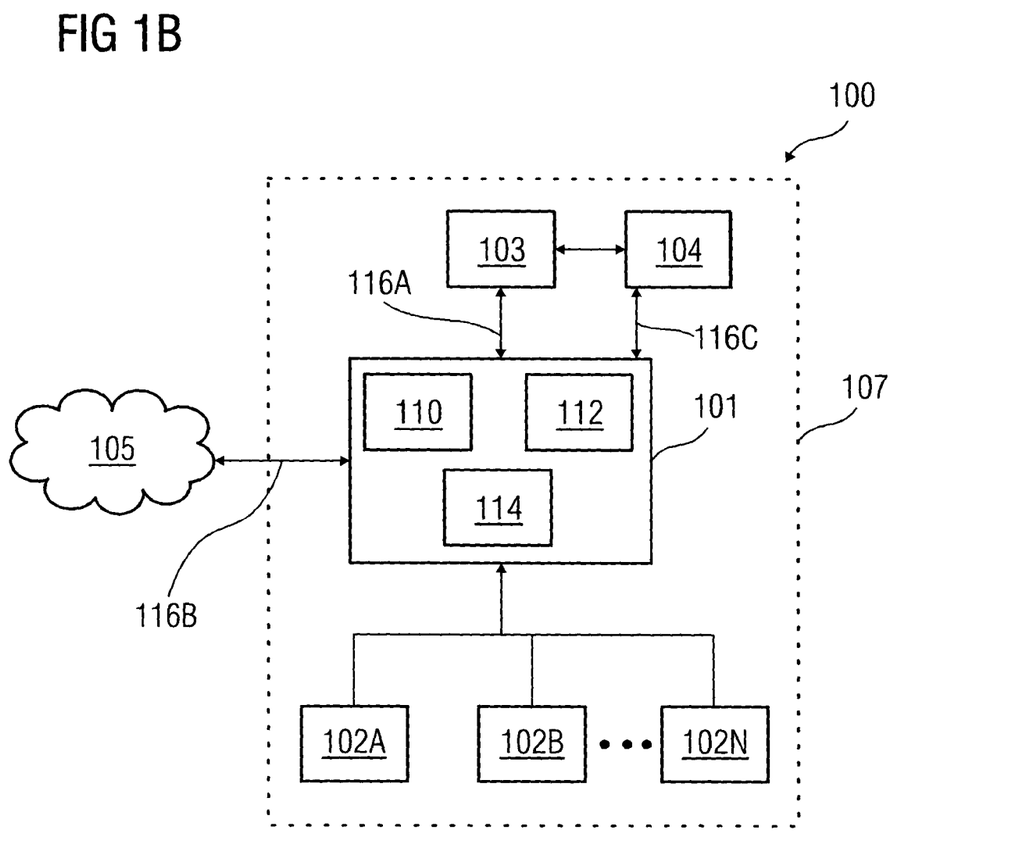
FIG. 1B is a schematic representation of the automation system, according to a second embodiment.

FIG. 1A is a schematic representation of an industrial installation 100, according to a first embodiment. The industrial installation 100 may be an industrial setup such as manufacturing facility, power plant, etc. The industrial installation 100 includes an automation system 107. The automation system 107 includes a self-configurable device 101. The self-configurable device 101 is connected to one or more field devices 102A-N (e.g., equipment, machines, sensors, actuators, etc.) and one or more automation devices 103. Such connection may be wired or wireless. The self-configurable device 101 includes a self-configuration module 110, a calibration module 112, and a network interface 114. The self-configurable device 101 is capable of communicating with the one or more field devices 102A-N and the one or more automation devices 103 through the Internet or a network. The automation system 107 further includes a human machine interface (HMI) device 104 connected to the one or more automation device 103. The component 104 may also be, for example, an engineering server, operator station, connectivity server, OPC server, etc. The self-configurable device 101 is capable of communicating with the one or more automation devices 103 using the network interface 114 and a communication link 116A via the Internet or a network. The HMI device 104 is capable of communicating with the self-configurable device 101 using a communication link 116C. FIG. 1B is a schematic representation of an industrial installation 100, according to a second embodiment. In the second embodiment, the self-configurable device 101 may be connected to a cloud platform 105. The self-configurable device 101 is capable of communicating with the cloud platform 105 using the network interface 114 via communication link 116B. The communication links 116A to 116B may be wired or wireless links.

The self-configurable device 101 and the automation device 103 may have an operating system and at least one software program for performing desired operations in the industrial installation 100. Also, the field devices 102A-N may run software applications for collecting, and pre-processing plant data (process data) and transmitting the pre-processed data to the self-configurable device 101 and/or to the cloud platform 105.

The cloud platform 105 may be a cloud infrastructure capable of providing cloud-based services such as data storage services, data analytics services, data visualization services, etc. based on the plant data. The cloud platform 105 may be part of public cloud or a private cloud. The cloud platform 105 may enable data scientists/software vendors to provide software applications/firmware as a service, thereby eliminating a need for software maintenance, upgrading, and backup by the users. The software application may be a full application or a software patch.

Figure 2:
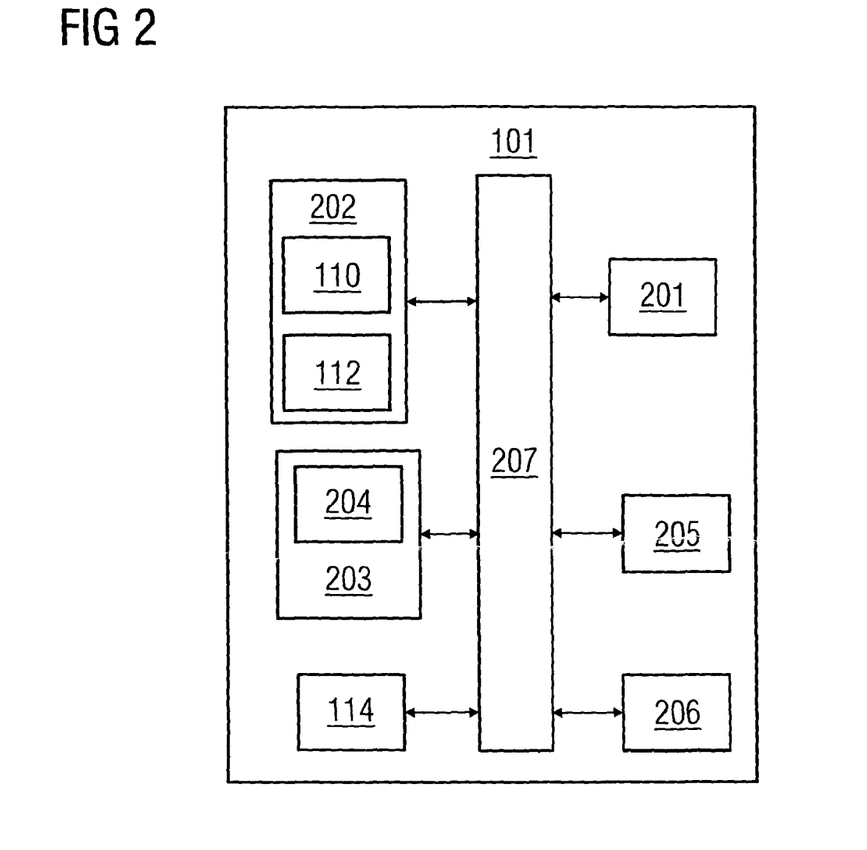
FIG. 2 illustrates block diagram of a self-configurable device, according to an embodiment.

The self-configurable device 101 is further illustrated in greater detail in FIG. 2. Referring to FIG. 2, the self-configurable device 101 includes a processing unit 201, a memory 202, a storage unit 203, a network interface 114, a standard interface, or bus 207. The self-configurable device 101 may be an exemplary embodiment of a system. The system 101 may be a computer (e.g., personal computer), a workstation, a virtual machine running on host hardware, a microcontroller, or an integrated circuit. As an alternative, the system 101 may be a real or a virtual group of computers (the technical term for a real group of computers is "cluster", the technical term for a virtual group of computers is "cloud").

The processing unit 201, as used herein, may be any type of computational circuit, such as, but not limited to, a microprocessor, microcontroller, complex instruction set computing microprocessor, reduced instruction set computing microprocessor, very long instruction word microprocessor, explicitly parallel instruction computing microprocessor, digital signal processor, or any other type of processing circuit. The processing unit 201 may also include embedded controllers, such as generic or programmable logic devices or arrays, application specific integrated circuits, single-chip computers, and the like. In general, a processing unit 201 may include hardware elements and software elements. The processing unit 201 may be configured for multithreading (e.g., the processing unit 201 may host different calculation processes at the same time), executing either in parallel, or switching between active and passive calculation processes.

The memory 202 may be volatile memory and non-volatile memory. The memory 202 may be coupled for communication with the processing unit 201. The processing unit 201 may execute instructions and/or code stored in the memory 202. A variety of computer-readable storage media may be stored in and accessed from the memory 202. The memory 202 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 202 includes a self-configuration module 110 stored in the form of machine-readable instructions on any of the above-mentioned storage media and may be in communication to and executed by processing unit 201. When executed by the processing unit 201, the self-configuration module 110 causes the processing unit 201 to dynamically manage connections between one or more field devices 102A-N and one or more automation devices 103. The memory 202 also includes a calibration module 112 that, when executed by the processing unit 201, causes the processing unit 201 to calibrate one or more field devices. Method acts executed by the processing unit 201 to achieve the abovementioned functionality are elaborated upon in detail in FIGS. 3, 4, 5, 6, and 7.

The storage unit 203 may be a non-transitory storage medium that stores a technical database 204. The technical database 204 may store an event history of the one or more field devices 102A-N and the one or more automation devices 103 in the industrial installation 100. The storage unit 203 also includes signal tables and control schemas based on distributed automation function. Additionally, the technical database 204 may also include baseline and real-time state-space representations of the automation system 107. The input device is capable of receiving input signal from one or more field devices. The bus 207 acts as interconnect between the processing unit 201, the memory 202, the storage unit 203, the input unit 205, the output unit 206, and the network interface 114.

Those of ordinary skill in the art will appreciate that the hardware depicted in FIG. 2 may vary for particular implementations. For example, other peripheral devices such as an optical disk drive and the like, Local Area Network (LAN)/Wide Area Network (WAN)/Wireless (e.g., Wi-Fi) adapter, graphics adapter, disk controller, input/output (I/O) adapter also may be used in addition or in place of the hardware depicted. The depicted example is provided for the purpose of explanation only and is not meant to imply architectural limitations with respect to the present disclosure.

A system in accordance with an embodiment of the present disclosure includes an operating system employing a graphical user interface. The operating system permits multiple display windows to be presented in the graphical user interface simultaneously with each display window providing an interface to a different application or to a different instance of the same application. A cursor in the graphical user interface may be manipulated by a user through the pointing device. The position of the cursor may be changed, and/or an event such as clicking a mouse button may be generated to actuate a desired response.

One of various commercial operating systems, such as a version of Microsoft Windows™, a product of Microsoft Corporation located in Redmond, Washington, may be employed if suitably modified. The operating system is modified or created in accordance with the present disclosure as described.

The present disclosure is not limited to a particular computer system platform, processing unit, operating system, or network. One or more aspects of the present disclosure may be distributed among one or more computer systems (e.g., servers configured to provide one or more services to one or more client computers, or to perform a complete task in a distributed system). For example, one or more aspects of the present disclosure may be performed on a client-server system that includes components distributed among one or more server systems that perform multiple functions according to various embodiments. These components include, for example, executable, intermediate, or interpreted code, which communicate over a network using a communication protocol. The present disclosure is not limited to be executable on any particular system or group of systems, and is not limited to any particular distributed architecture, network, or communication protocol.

Disclosed embodiments provide systems, devices, and methods for dynamically managing a connection between one or more field devices and one or more automation devices in an automation system.

Figure 3:
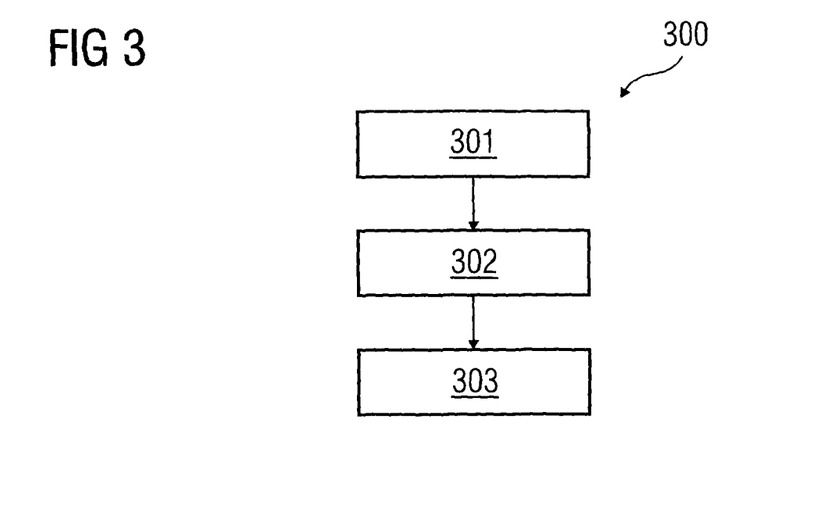
FIG. 3 illustrates a flowchart of a method of managing a connection between one or more field devices and one or more automation devices, according to an embodiment.

FIG. 3 illustrates a flowchart of a method 300 of managing a connection between one or more field devices 102A-N and one or more automation devices 103, in the industrial installation 100. The method includes act 301 of identifying one or more field devices 102A-N in the industrial installation 100. One or more field devices 102A-N may be deployed in the industrial installation 100 and are configured to capture one or more parameters associated with the functioning of the industrial installation 100. The field devices 102A-N may include, for example, actuators, sensors, pneumatic devices, transmitters, switches, etc. At act 302, the method 300 includes identifying one or more automation devices 103 in the industrial installation 100. The one or more automation devices 103 may include, for example, programmable logic controllers, HMI devices, etc. Such identification of one or more field devices 102A-N and one or more automation devices 103 may be performed based on one or more signals from the one or more field devices 102A-N and the one or more automation devices 103. At act 303, the method includes establishing a connection between the one or more field devices 102A-N and the one or more automation devices 103. The method acts describing the establishment of connection between the one or more field devices 102A-N and the one or more automation devices 103 are explained in detail under FIG. 4.

Figure 4:
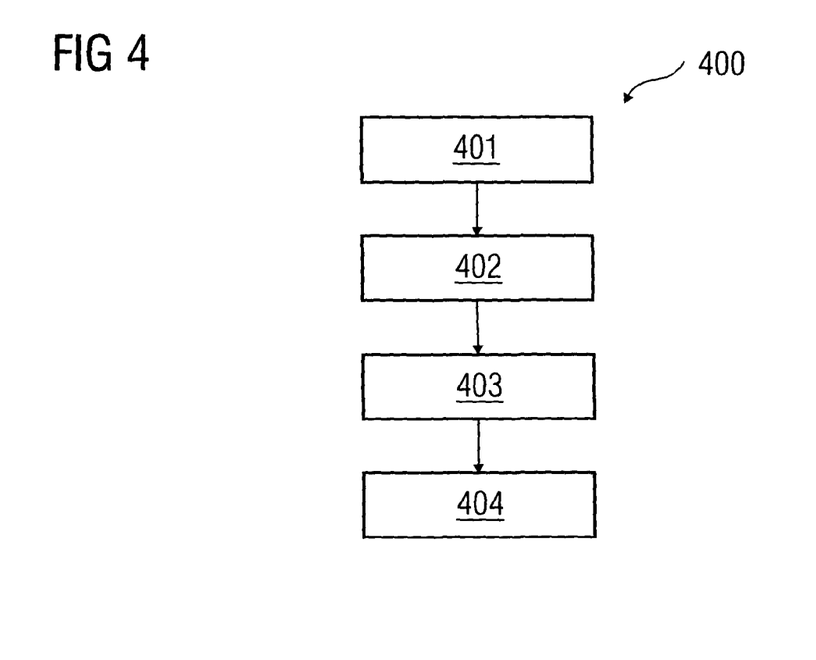
FIG. 4 illustrates a flowchart of a method of establishing a connection between one or more field devices and one or more automation devices, according to an embodiment.

Referring to FIG. 4, the method 400 includes act 401 of determining a network configuration associated with the industrial installation 100. The network configuration of the industrial installation 100 may include, for example, PROFINET parameters for the operating conditions of the industrial installation. The network configuration enables identification of sources of origin of signal(s) in the industrial installation 100. The signal sources may be, for example, the one or more field devices 102A-N. The network configuration also enables identification of destination/target devices for the generated signals. Each signal originating from a field device 102A-N may be transmitted to a target device in the industrial installation 100. Such target device may be, for example, one or more automation devices 103. The network configuration further enables identification of functional data associated with the industrial installation. The method 400 further includes act 402 of identifying at least one attribute associable with the one or more field devices 102A-N. Such attribute may be, for example, data associated with device configuration such as, but not limited to, device type, device description, field device technology (FDT) configuration, etc. At act 403, at least one attribute associable with the one or more automation devices 103 is identified. Such attribute may be, for example, device description of the automation devices 103, network parameters associated with the automation devices 103, etc. At act 404, an association between the one or more field devices 102A-N and the one or more automation devices 103 is determined based on the identified one or more attributes associable with the one or more field devices 102A-N and the one or more automation devices 103. In an embodiment, a mapping of the signal source, signal destination(s), and device specific information may be performed to determine the association between the one or more field devices 102A-N and the one or more automation devices 103. Such device specific information may be obtained from engineering configuration of the automation system 107. Additionally, the mapping may also include communication signals, archiving data, etc. In a further embodiment, on determination of the association, the one or more field devices 102A-N and the one or more automation devices 103 may be connected. Such establishment of connection between the one or more field devices 102A-N and the one or more automation devices 103 is achieved through the self-configurable device 101. In yet another embodiment, logical source and destination signal tables may be generated. Based on such table, one or more signals may be routed to a target automation device 103 when a corresponding event may be triggered or when a dead-band is exceeded.

Figure 5:
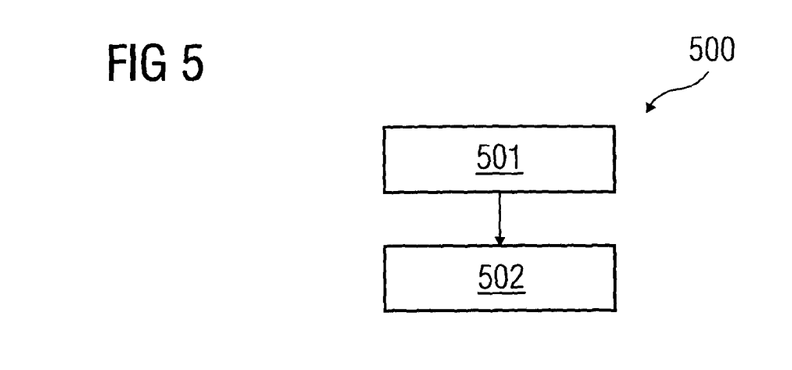
FIG. 5 illustrates a flowchart of a method of configuring the self-configurable device, according to an embodiment.

FIG. 5 provides an illustration of a flowchart of a method 500 of configuring a self-configurable device 101, according to an embodiment. At act 501, a set of configuration settings are received from a server (e.g., the cloud platform 105). The configuration settings may be determined based on the one or more field devices 102A-N and the one or more automation devices 103 connected to the self-configurable device 101. Such configuration settings include one or more parameters for configuring the self-configurable device 101. Therefore, the self-configurable device 101 may be a 'plug-and-play' device that may dynamically establish a connection or a communication channel between the one or more field devices 102A-N and the one or more automation devices 103. At act 502, the self-configurable device 101 is configured using the configuration settings such that an active communication channel is established dynamically between the one or more field devices 102A-N and the one or more automation devices 103.

In an embodiment, the self-configurable device 101 is configured to generate an alarm if an error in communication between the one or more field devices 102A-N and the one or more automation devices 103 or between self-configurable device 101 and one or more field devices 102A-N or one or more automation devices 103 is identified. Such communication error may occur, for example, if the self-configurable device 101 is disconnected from the one or more field devices 102A-N or the one or more automation devices 103. Alternatively, communication error may also occur if signal levels from the one or more field devices 102A-N are below NAMUR signal levels.

Figure 7:
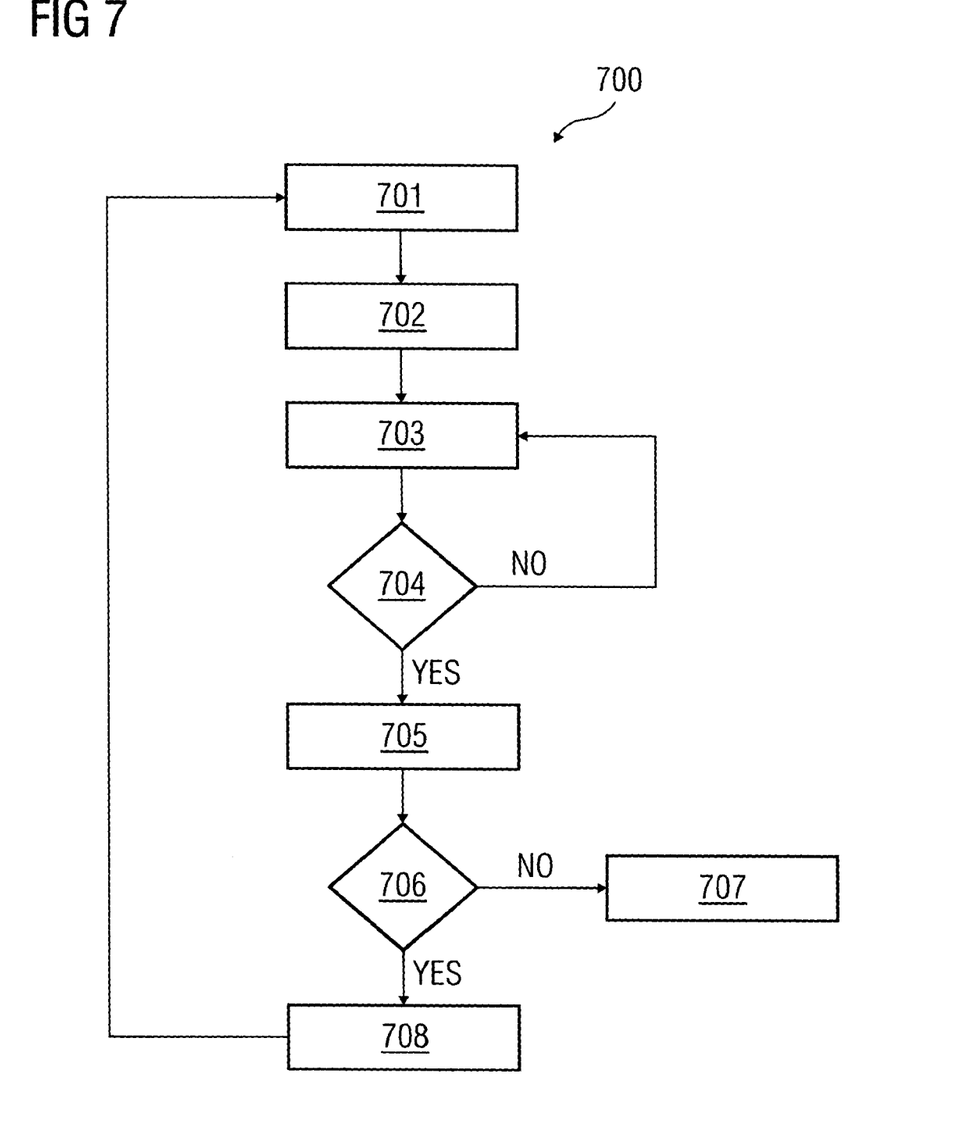
FIG. 7 illustrates a flowchart of a method of automatically calibrating the automation system, according to an embodiment.

FIG. 7 illustrates a flowchart of a method 700 of automatically calibrating the field devices 102A-N. The one or more field devices 102A-N are monitored at regular intervals to determine efficient functioning and the effect of related field parameters on such one or more field devices 102A-N. The one or more field devices 102A-N may need calibration/recalibration at regular intervals so as to provide efficient functioning of the automation system 107. The determination of need for a calibration may be determined by framing a state-space representation of the automation system 107 and/or a section of the industrial installation 100. State-space representation provides an overview of the state of the system 107 at any given point in time. At act 701, a baseline state-space representation of the automation system 107 is obtained. The baseline state-space representation includes a model of a set of at least one input variable, at least one output variable, and at least one state variable of the automation system corresponding to an optimum functioning of the automation system. The baseline state-space representation may be automatically determined, for example, based on one or more optimum working conditions of at least one section of the industrial installation 100 and control schemes in the engineering configuration of the industrial installation 100. The state-space representation of a system may be represented as follows:

$$X = Ax + Bu \tag{1}$$

$$Y = Cx + Du \tag{2}$$

where X is the state vector, Y is the output vector, u is the input vector or variables associated with the at least one section of the industrial installation 100, A is the system matrix or constants describing the at least one section of the industrial installation 100, B is the input matrix or constants describing the at least one section of the industrial installation 100, C is the output matrix or constants that weigh the state variables, D is the feedthrough matrix or constants that weigh the variables associated with the at least one section of the industrial installation 100.

Figure 6:
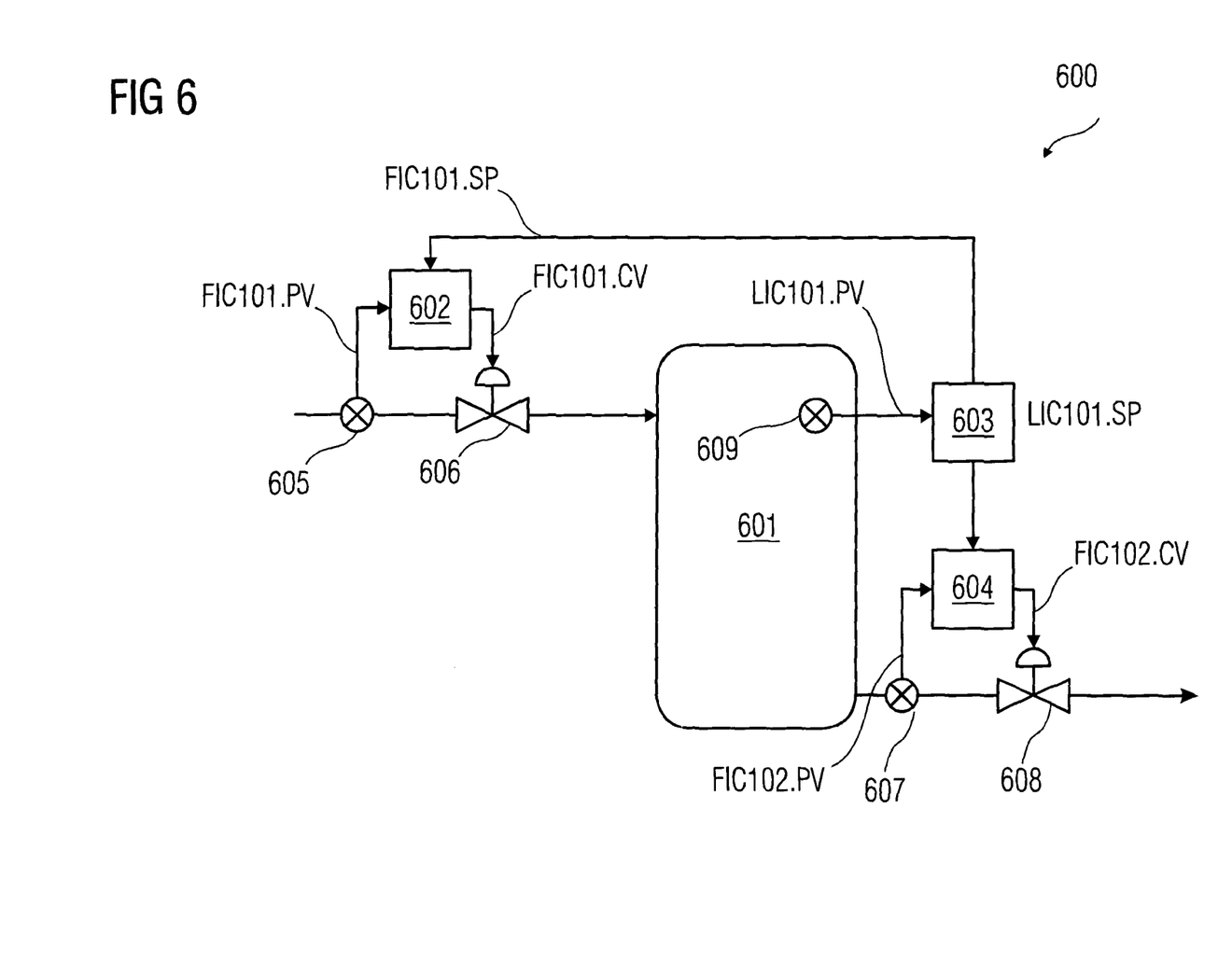
FIG. 6 illustrates a schematic representation of a section of industrial installation.

The method of derivation of a state-space representation is well-known in the state of the art and has not been described for the purposes of brevity. In an embodiment, the baseline state-space representation may be automatically determined based on optimum operating conditions of at least one section of the industrial installation 100. The derivation of the baseline state-space representation may be performed during plant commissioning or maintenance process of the industrial installation 100. The process of determining the baseline state-space representation is described with an illustrative example of a section 600 of an industrial installation 100, in FIG. 6. Referring to FIG. 6, the section 600 of the industrial installation 100 includes a container 601. The container 601 may include a substance that may be required to be maintained at a pre-defined level. The container 601 may include one or more input and output valves, and the level of substance may be maintained by controlling inlet and outlet flow rate of the substance in the container 601. The container 601 may be further associated with a flow indicator and controller 602 for inlet flow to the container 601, a level indicator and controller 603, a flow indicator and controller 604 for outlet flow from the container 601. Control scheme of the section 600 of the industrial installation 100 may be configured and controlled during run-time of the section 600. A desired pre-defined level of the substance in the container 601 is set as a set-point LIC101.SP at the level indicator and controller 603. An actual level of the substance in the container 601 is determined using a level transmitter 609 in the container 601. Such input of the actual level of the substance is transmitted to the level indicator and controller 603. The level indicator and controller 603 determines if the actual level deviates from the desired pre-defined level. Based on the deviation, the level indicator and controller 603 computes an output CV1/CV2 that is analyzed by a standard control algorithm. Such standard control algorithm may monitor and control the flow parameters of the substance in the container 601. The standard control algorithm, based on the analysis, may compute an output FIC101.SP/FIC102.SP to the flow indicator and controller 602 for inlet flow to the container 601 and/or to the flow indicator and controller 604 for outlet flow from the container 601. The inlet flow FIC101.PV is measured by an inlet flow transmitter 605 and provided to the inlet flow indicator and controller 602. The outlet flow FIC102.PV is measured by an outlet flow transmitter 607 and provided to outlet flow indicator and controller 604. The flow indicator and controller unit 602 for the inlet flow and the flow indicator and controller unit for the outlet flow 604 derive an output signal FIC101.CV/FIC102.CV for operation of valves 606 and 608 to desired set-point calculated by the level indicator and controller unit 603.

The section 600 of the industrial installation 100 may be considered for determination of the state-space representation to identify a need for calibration of one or more components of the section 600. The state-space representation may be determined based on the following acts:

Act 1: The state variables are identified automatically based on the control scheme:

$$\begin{bmatrix} x1 \\ x2 \\ x3 \\ x4 \end{bmatrix} = \begin{bmatrix} 603 \\ 604 \\ 606.\% \text{ open feedback} \\ 608.\% \text{ open feedback} \end{bmatrix}$$

Act 2: The system input variables are identified automatically based on the control scheme:

$$\begin{bmatrix} u1 \\ u2 \\ u3 \\ u4 \\ u5 \end{bmatrix} = \begin{bmatrix} LIC101.SP \\ FIC101.SP \\ FIC102.SP \\ FIC101.CV \\ FIC102.CV \end{bmatrix}$$

Act 3: First order differential equations are derived based on the state variables and system input variables:

$$\frac{dx1}{dt} = a11.x1 + a12.x2 + a13.x3 +$$
$$a14.x4 + b11.u1 + b12.u2 + b13.u3 + b14.u4 + b15.u5$$
$$\frac{dx2}{dt} = a21.x1 + a22.x2 + a23.x3 + a24.x4 +$$
$$b21.u1 + b22.u2 + b23.u3 + b24.u4 + b25.u5$$
$$\frac{dx3}{dt} = a31.x1 + a32.x2 + a33.x3 + a34.x4 +$$
$$b31.u1 + b32.u2 + b33.u3 + b34.u4 + b35.u5$$
$$\frac{dx4}{dt} = a41.x1 + a42.x2 + a43.x3 + a44.x4 +$$
$$b41.u1 + b42.u2 + b43.u3 + b44.u4 + b45.u5$$

Act 4: Matrix A & B of state equation (1) are determined, and the state equation is computed. For various values of Ui during the industrial installation process, the state equations are framed and resolved to find the constants describing the system 600 under consideration.

$$A = \begin{bmatrix} a11 & a12 & a13 & a14 \\ a21 & a22 & a23 & a24 \\ a31 & a32 & a33 & a34 \\ a41 & a42 & a43 & a44 \end{bmatrix}$$

$$B = \begin{bmatrix} b11 & b12 & b13 & b14 & b15 \\ b21 & b22 & b23 & b24 & b25 \\ b31 & b32 & b33 & b34 & b35 \\ b41 & b42 & b43 & b44 & b45 \end{bmatrix}$$

Hence, the state equation X=Ax+Bu is derived.

Act 5: The output variables are automatically determined from the control scheme, and the output equations are framed for n(4) state variables and r(5) system inputs. The system outputs are directly connected to the level set-point LIC101.SP, and hence, the output variable is the level of the container LIC101.PV. During stable operation of the industrial installation 100, various container levels are observed for different combinations of state variables and system input parameters. The number of iterations depends on the number of state variables added to number of system input variables. If m such iterations are to be provided, the first order differential equation is derived as follows:

$$y1 = c11.x1 + c12.x2 + c13.x3 + c14.x4 +$$
$$d11.u1 + d12.u2 + d13.u3 + d14.u4 + d15.u5$$
$$y2 = c21.x1 + c22.x2 + c23.x3 + c24.x4 + d21.u1 +$$
$$d22.u2 + d23.u3 + d24.u4 + d25.u5$$
$$\ldots$$
$$ym = cm1.x1 + cm2.x2 + cm3.x3 + cm4.x4 +$$
$$dm1.u1 + dm2.u2 + dm3.u3 + dm4.u4 + dm5.u5$$

Act 6: Matrix C & D of output equation (2) are determined, and the output equation is computed. For various values of Ui during the industrial installation process, the state equations are framed and resolved to find the constants describing the system under consideration.

$$C = \begin{bmatrix} c11 & c12 & c13 & c14 \\ c21 & c22 & c23 & c24 \\ \ldots & \ldots & \ldots & \ldots \\ cm1 & cm2 & cm3 & cm4 \end{bmatrix}$$

$$D = \begin{bmatrix} d11 & d12 & d13 & d14 & d15 \\ d21 & d22 & d23 & d24 & d25 \\ \ldots & \ldots & \ldots & \ldots & \ldots \\ dm1 & dm2 & dm3 & dm4 & dm5 \end{bmatrix}$$

Hence, the output equation Y=Cx+Du is derived.

At act 702 of the method 700, a real-time state-space representation of the automation system 107 is determined. The real-time state-space representation includes a model of a set of at least one input variable, at least one output variable, and at least one state variable corresponding to a real-time functioning of the automation system 107. At act 703, the real-time state-space representation is compared with the baseline state-space representation to identify a deviation. If a deviation is identified at act 704, a notification or alarm is generated at act 705, for example, in the HMI device 104. Such notification may be presented to the user of the industrial installation 100 to determine if a calibration of the field devices 102A-N is to be performed. At act 706, a determination is made if calibration of the automation system 107 is to be performed. If the calibration is to be performed, at act 708, the real-time state-space representation of the automation system 107 is calibrated based on the baseline state-space representation. Alternatively, an alarm is generated for maintenance and calibration of the automation system 107. If the calibration is not to be performed, at act 707, the baseline state-space representation is modified according to the real-time state-space representation of the automation system 107.

In an embodiment, the self-configurable device 101 is configured to perform one or more functions of a controller unit in an industrial installation 100. The controller unit may be configured to monitor and control a plurality of processes in the industrial installation 100 so as to enable efficient functioning of the industrial installation 100. An average industrial installation 100 includes a number of signals originating from one or more field devices 102A-N. A portion of such signals may form a part of process control schemes. However, the rest of the signals may be associated only with monitoring and closed loop control of the industrial installation 100. In an embodiment, signal processing functions, simple monitoring loops, and simple control loops may be transferred from the controller unit to the self-configurable device 101 associated with the target automation device 103. Such transfer of functions from the controller unit may be performed based on a bandwidth capacity of the self-configurable device 101. Transfer of such functions to the self-configurable device 101 enables efficient management and processing of signals in the industrial installation 100. Additionally, transfer of such functions from the controller unit to the self-configurable device 101 enables the controller unit to be efficiently used for complex process controls that may require greater processing capacity.

Figure 8:
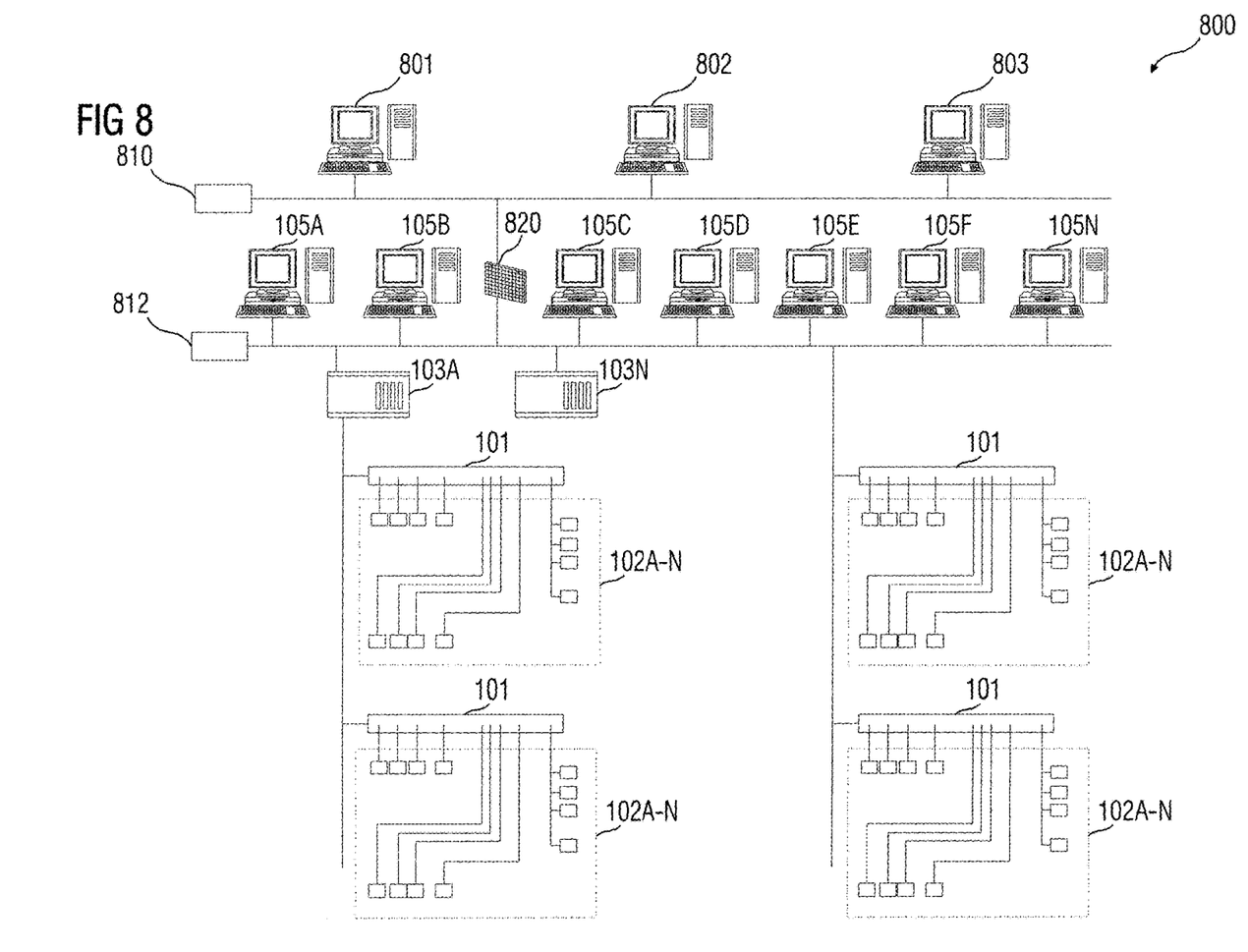
FIG. 8 is a high-level schematic representation of an automation system in an industrial installation, according to a first embodiment.

FIG. 8 is a high-level schematic representation 800 of the industrial installation 100, according to an embodiment. The self-configurable device 101 is connected to the one or more field devices 102A-N and one or more automation devices 103A-N. The self-configuration device 101 may be connected to one or more servers 105A-N. The servers may be, for example, an engineering server, an archiving server, a calculation server, a communication server, etc. The servers 105A-N may include data associated with the industrial installation 100 such as, but not limited to, events and alarms of the industrial installation 100. The servers 105A-N may also include data associated with the operation of the industrial installation 100. At least one of the servers 105A-N may be an OPC-UA server. The self-configurable device 101 may be directly connected to a plant network 810 or a control network 812. A Thin client 801, a web client 802, and SAP systems 803 may be connected to the industrial installation 100 via the plant network 810 and a firewall 820 for secured access.

The foregoing examples have been provided merely for the purpose of explanation and are in no way to be construed as limiting of the present disclosure disclosed herein. While the present disclosure has been described with reference to various embodiments, it is understood that the words, which have been used herein, are words of description and illustration, rather than words of limitation. Further, although the present disclosure has been described herein with reference to particular means, materials, and embodiments, the present disclosure is not intended to be limited to the particulars disclosed herein; rather, the present disclosure extends to all functionally equivalent structures, methods, and uses, such as are within the scope of the appended claims. Those skilled in the art, having the benefit of the teachings of this specification, may affect numerous modifications thereto, and changes may be made without departing from the scope and spirit of the present disclosure in its aspects.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. An automation system comprising:
    one or more field devices;
    one or more automation devices; and
    a self-configurable device configured to dynamically configure based on type of the one or more field devices and the one or more automation devices such that the self-configurable device manages a connection between the one or more field devices and the one or more automation devices,
    wherein the self-configurable device comprises a calibration module, wherein the calibration module is configured to:
        obtain a baseline state-space representation of the automation system, wherein the baseline state-space representation comprises a model of a set of at least one input variable, at least one output variable, and at least one state variable of the automation system corresponding to an optimum functioning of the automation system;
        determine a real-time state-space representation of the automation system, wherein the real-time state-space representation comprises a model of a set of at least one input variable, at least one output variable, and at least one state variable corresponding to a real-time functioning of the automation system;
        compare the baseline state-space representation with the real-time state-space representation to identify a deviation;
        modify the baseline state-space representation based on the real-time state-space representation when the deviation is identified; and configure the self-configurable device to dynamically establish an active communication channel between the one or more field devices and the one or more automation devices.

2. The automation system of claim 1, wherein the self-configurable device comprises:
   at least one first port configured to connect the one or more field devices;
   at least one second port configured to connect the one or more automation devices;
   a processing unit; and
   a memory coupled to the processing unit.

3. The automation system of claim 2, wherein the memory of the self-configurable device comprises a self-configuration module, wherein the self-configuration module is configured to:
   identify the one or more field devices installed in an industrial installation;
   identify the one or more automation devices installed in the industrial installation; and
   establish a connection between the one or more field devices and the one or more automation devices in the industrial installation.

4. The automation system of claim 3, wherein the self-configuration module is configured to:
   determine a network configuration associated with the industrial installation;
   identify at least one attribute associable with the one or more field devices;
   identify at least one attribute associable with the one or more automation devices; and
   determine an association between the one or more field devices and the one or more automation devices based on the at least one attribute associable with the one or more field devices, the at least one attribute associable with the one or more automation devices, and the network configuration associated with the industrial installation.

5. The automation system of claim 4, wherein the self-configuration module is further configured to:
   receive a set of configuration settings based on the identified one or more field devices and the one or more automation devices from a server, wherein the set of configuration settings comprises one or more parameters for configuring the self-configurable device; and
   configure the self-configurable device using the set of configuration settings.

6. The automation system of claim 5, wherein the memory of the self-configurable device further comprises a calibration module configured to automatically calibrate the automation system.

7. A method of managing a connection between one or more field devices and one or more automation devices in an industrial automation, the method comprising:
   identifying the one or more field devices;
   identifying the one or more automation devices;
   establishing a connection between the one or more field devices and the one or more automation devices in the industrial installation; and
   automatically calibrating an automation system,
   wherein automatically calibrating the automation system comprises:
      obtaining a baseline state-space representation of the automation system, wherein the baseline state-space representation comprises a model of a set of at least one input variable, at least one output variable, and at least one state variable of the automation system corresponding to an optimum functioning of the automation system;
      determining a real-time state-space representation of the automation system, wherein the real-time state-space representation comprises a model of a set of at least one input variable, at least one output variable, and at least one state variable corresponding to a real-time functioning of the automation system;
      identifying a deviation, identifying the deviation comprising comparing the baseline state-space representation with the real-time state-space representation;
      modifying the baseline state-space representation based on the real-time state-space representation when the deviation is identified; and
      configuring the self-configurable device, such that an active communication channel between the one or more field devices and the one or more automation devices is dynamically established.

8. The method of claim 7, wherein establishing the connection between the one or more field devices and the one or more automation devices comprises:
   determining a network configuration associated with the industrial installation;
   identifying at least one attribute associable with the one or more field devices;
   identifying at least one attribute associable with the one or more automation devices; and
   determining an association between the one or more field devices and the one or more automation devices based on the at least one attribute associable with the one or more field devices, the at least one attribute associable with the one or more automation devices, and the network configuration associated with the industrial installation.

9. The method of claim 8, further comprising:
   receiving a set of configuration settings based on the identified one or more field devices and the one or more automation devices from a server, wherein the set of configuration settings comprises one or more parameters for configuring a self-configurable device; and
   configuring the self-configurable device using the set of configuration settings.

10. In a non-transitory computer-readable storage medium that stores machine readable instructions executable by a processing unit to manage a connection between one or more field devices and one or more automation devices in an industrial installation, the machine readable instructions comprising:
   identifying the one or more field devices;
   identifying the one or more automation devices;
   establishing a connection between the one or more field devices and the one or more automation devices in the industrial installation; and
   automatically calibrating an automation system,
   wherein automatically calibrating the automation system includes:
      obtaining a baseline state-space representation of the automation system, wherein the baseline state-space representation comprises a model of a set of at least one input variable, at least one output variable, and at least one state variable of the automation system corresponding to an optimum functioning of the automation system;
      determining a real-time state-space representation of the automation system, wherein the real-time state-space representation comprises a model of a set of at least one input variable, at least one output variable, and at least one state variable corresponding to a real-time functioning of the automation system;

identifying a deviation, identifying the deviation comprising comparing the baseline state-space representation with the real-time state-space representation;

modifying the baseline state-space representation based on the real-time state-space representation when the deviation is identified; and configure the self-configurable device to dynamically establish an active communication channel between the one or more field devices with the one or more automation devices.

11. The non-transitory computer-readable storage medium of claim 10, wherein establishing the connection between the one or more field devices and the one or more automation devices comprises:

determining a network configuration associated with the industrial installation;

identifying at least one attribute associable with the one or more field devices;

identifying at least one attribute associable with the one or more automation devices; and determining an association between the one or more field devices and the one or more automation devices based on the at least one attribute associable with the one or more field devices, the at least one attribute associable with the one or more automation devices, and the network configuration associated with the industrial installation.

12. The non-transitory computer-readable storage medium of claim 10, wherein the machine readable instructions further comprise:

receiving a set of configuration settings based on the identified one or more field devices and the one or more automation devices from a server, wherein the set of configuration settings comprises one or more parameters for configuring a self-configurable device; and configuring the self-configurable device using the set of configuration settings.

\* \* \* \* \*